United States Patent
Plaehn

(10) Patent No.: US 9,285,876 B2
(45) Date of Patent: *Mar. 15, 2016

(54) TRANSPARENT DISPLAY FIELD OF VIEW REGION DETERMINATION

(71) Applicant: International Business Machines Corporation, Armonk, NY (US)

(72) Inventor: William H. Plaehn, Clifton, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/614,828

(22) Filed: Feb. 5, 2015

(65) Prior Publication Data

US 2015/0145771 A1     May 28, 2015

Related U.S. Application Data

(63) Continuation of application No. 13/768,548, filed on Feb. 15, 2013, now Pat. No. 9,041,645.

(51) Int. Cl.
| | |
|---|---|
| *G09G 5/00* | (2006.01) |
| *G06F 3/01* | (2006.01) |
| *G09G 3/00* | (2006.01) |

(52) U.S. Cl.
CPC ................ *G06F 3/013* (2013.01); *G09G 3/003* (2013.01); *G09G 2340/14* (2013.01); *G09G 2354/00* (2013.01)

(58) Field of Classification Search
CPC .......... G06F 3/005; G06F 3/012; G06F 3/013
USPC .................. 345/156–184; 340/944, 988–996; 701/400, 408–541

See application file for complete search history.

(56) References Cited

U.S. PATENT DOCUMENTS

| | | | |
|---|---|---|---|
| 7,986,299 B2 | 7/2011 | Ota et al. | |
| 8,159,458 B2 | 4/2012 | Quennesson | |
| 8,571,579 B2 | 10/2013 | Lindner | |

(Continued)

FOREIGN PATENT DOCUMENTS

| | | |
|---|---|---|
| EP | 1056049 | 11/2000 |
| WO | 2011125007 | 10/2011 |
| WO | 2012054063 | 4/2012 |

OTHER PUBLICATIONS

Notice of Allowance (Mail Date Jun. 12, 2015) for U.S. Appl. No. 13/768,337, filed Feb. 15, 2013.

(Continued)

*Primary Examiner* — Stephen Sherman
(74) *Attorney, Agent, or Firm* — Schmeiser, Olsen & Watts; Matthew Chung

(57) ABSTRACT

A method and system for determining a field of view region on a transparent display is provided. The method includes receiving from a user facing device, a user image. User image key features of the user image are identified and user image attributes of said image key features are analyzed. An object image of objects is received and a first object is identified. Object key features of the first object are identified and object attributes of object key features are analyzed. A specified position on a transparent display for displaying a first image associated with the first object is determined. The first image is displayed at the specified position on the transparent display.

20 Claims, 7 Drawing Sheets

(56) References Cited

U.S. PATENT DOCUMENTS

| | | |
|---|---|---|
| 9,041,645 B2 | 5/2015 | Plaehn |
| 9,167,147 B2 | 10/2015 | Plaehn |
| 2008/0002964 A1 | 1/2008 | Edwards |
| 2009/0048767 A1 | 2/2009 | Vaughn |
| 2009/0313584 A1 | 12/2009 | Kerr et al. |
| 2011/0285622 A1 | 11/2011 | Marti et al. |
| 2012/0098761 A1 | 4/2012 | Mitchell et al. |
| 2012/0120186 A1 | 5/2012 | Diaz et al. |
| 2012/0147328 A1 | 6/2012 | Yahav |
| 2012/0162603 A1 | 6/2012 | Dejima |
| 2012/0200498 A1 | 8/2012 | Quennesson |
| 2012/0210233 A1 | 8/2012 | Davis et al. |
| 2012/0212484 A1 | 8/2012 | Haddick et al. |
| 2013/0207896 A1 | 8/2013 | Robinson et al. |
| 2014/0232630 A1 | 8/2014 | Plaehn |
| 2014/0232881 A1 | 8/2014 | Plaehn |

OTHER PUBLICATIONS

Amendment filed Dec. 31, 2014 in response to Office Action (Mail Date Oct. 8, 2014) for U.S. Appl. No. 13/768,548, filed Feb. 15, 2013.

Notice of Allowance (Mail Date Jan. 16, 2015) for U.S. Appl. No. 13/768,548, filed Feb. 15, 2013.

Office Action (Mail Date Oct. 8, 2014) for U.S. Appl. No. 13/768,548, filed Feb. 15, 2013.

Office Action (Mail Date Jan. 16, 2015) for U.S. Appl. No. 13/768,337, filed Feb. 15, 2013.

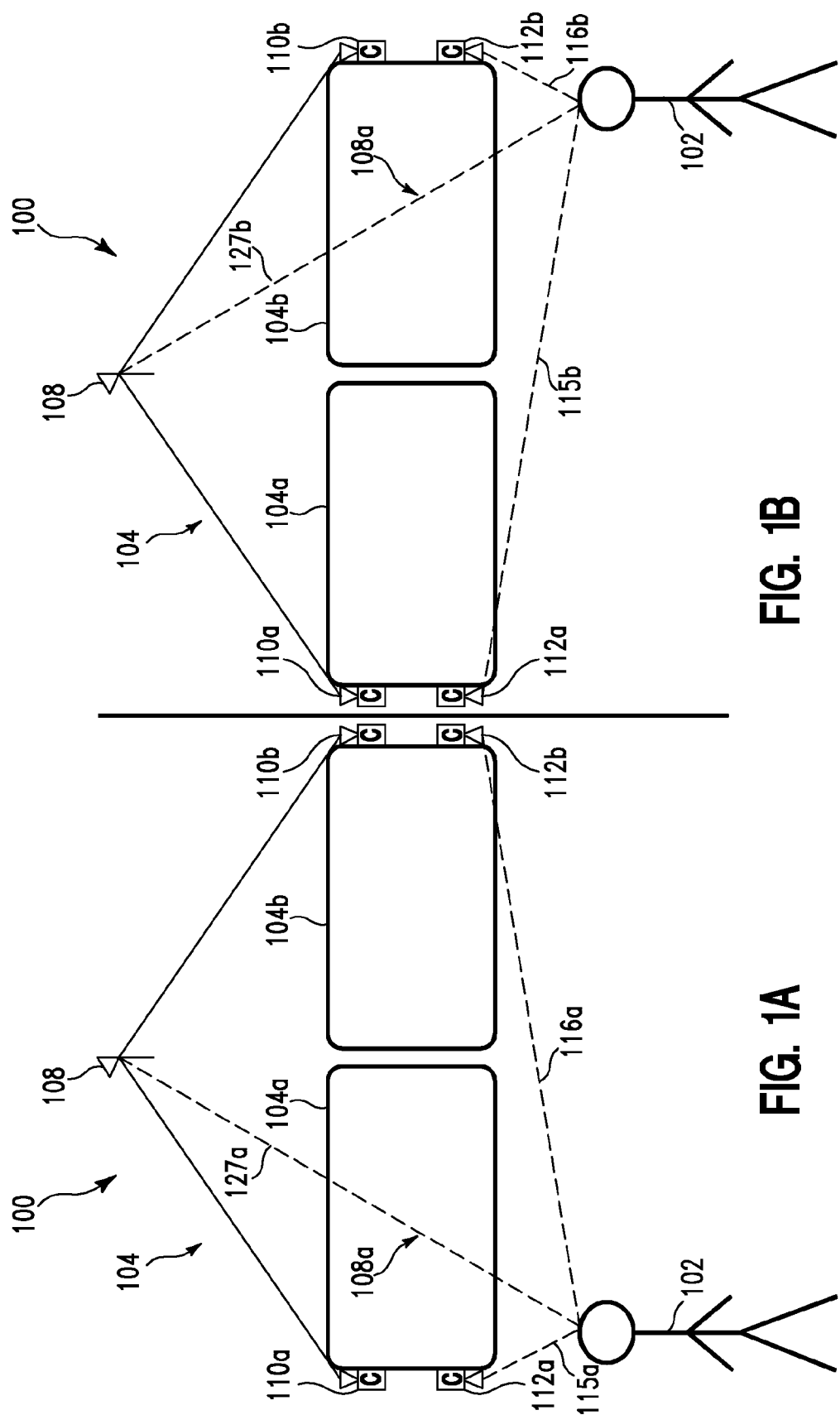

TRANSPARENT DISPLAY FIELD OF VIEW REGION DETERMINATION

This application is a continuation application claiming priority to Ser. No. 13/768,548 filed Feb. 15, 2013, now U.S. Pat. No. 9,041,645 issued May 26, 2015.

FIELD

The present invention relates generally to a method for determining a field of view region, and in particular to a method and associated system for determining a line of sight between a user and an object relative to a transparent display apparatus.

BACKGROUND

Determining image placement location typically includes an inaccurate process with little flexibility. Managing placement of various images may include a complicated process that may be time consuming and require a large amount of resources. Accordingly, there exists a need in the art to overcome at least some of the deficiencies and limitations described herein above.

SUMMARY

A first aspect of the invention provides a method including: receiving, by a computer processor of a computing apparatus from a user facing device, a user image; identifying, by the computer processor, user image key features of said user image; determining, by the computer processor based on the user image key features, user image attributes of the image key features; first analyzing, by the computer processor, the user image attributes; receiving, by the computer processor from an object facing device, an object image of objects; identifying, by the computer processor, a first object of the objects; identifying, by the computer processor, object key features of the first object; determining, by the computer processor based on the object key features, object attributes of the object key features; second analyzing, by the computer processor, the object attributes; determining, by the computer processor based on results of the first analyzing and the second analyzing, a specified position on a transparent display for displaying a first image associated with the first object; and displaying, by the computer processor at the specified position on the transparent display, the first image.

A second aspect of the invention provides a computer program product for field of view region determination on a transparent display, the computer program product including: one or more computer-readable, tangible storage devices; program instructions, stored on at least one of the one or more storage devices, to initiate receiving, from a user facing device, a user image; program instructions, stored on at least one of the one or more storage devices, to identify user image key features of the user image; program instructions, stored on at least one of the one or more storage devices, to determine based on the user image key features, user image attributes of the user image key features; program instructions, stored on at least one of the one or more storage devices, to first analyze, the user image attributes; program instructions, stored on at least one of the one or more storage devices, to receive from an object facing device, an object image of objects; program instructions, stored on at least one of the one or more storage devices, to identify a first object of the objects; program instructions, stored on at least one of the one or more storage devices, to identify object key features of the first object; program instructions, stored on at least one of the one or more storage devices, to determine, based on the object key features, object attributes of the object key features; program instructions, stored on at least one of the one or more storage devices, to second analyze the object attributes; program instructions, stored on at least one of the one or more storage devices, to determine, based on results of the first analyses and the second analyses, a specified position on a transparent display for displaying a first image associated with the first object; and program instructions, stored on at least one of the one or more storage devices, to display, at the specified position on the transparent display, the first image.

A third aspect of the invention provides a computing apparatus including a computer processor coupled to a computer-readable memory unit, the memory unit comprising instructions that when executed by the computer processor implements a method comprising: receiving, by the computer processor from a user facing device, a user image; identifying, by the computer processor, user image key features of the user image; determining, by the computer processor based on the user image key features, user image attributes of the image key features; first analyzing, by the computer processor, the user image attributes; receiving, by the computer processor from an object facing device, an object image of objects; identifying, by the computer processor, a first object of the objects; identifying, by the computer processor, object key features of the first object; determining, by the computer processor based on the object key features, object attributes of the object key features; second analyzing, by the computer processor, the object attributes; determining, by the computer processor based on results of the first analyzing and the second analyzing, a specified position on a transparent display for displaying a first image associated with the first object; and displaying, by the computer processor at the specified position on the transparent display, the first image.

The present invention advantageously provides a simple method and associated system capable of determining image placement.

BRIEF DESCRIPTION OF THE DRAWINGS

FIG. 1A illustrates a system for determining a line of sight between a user and an object relative to a transparent display apparatus, in accordance with embodiments of the present invention.

FIG. 1B illustrates an alternative view of the system the system of FIG. 1A, in accordance with embodiments of the present invention.

DETAILED DESCRIPTION

Figure 2A:
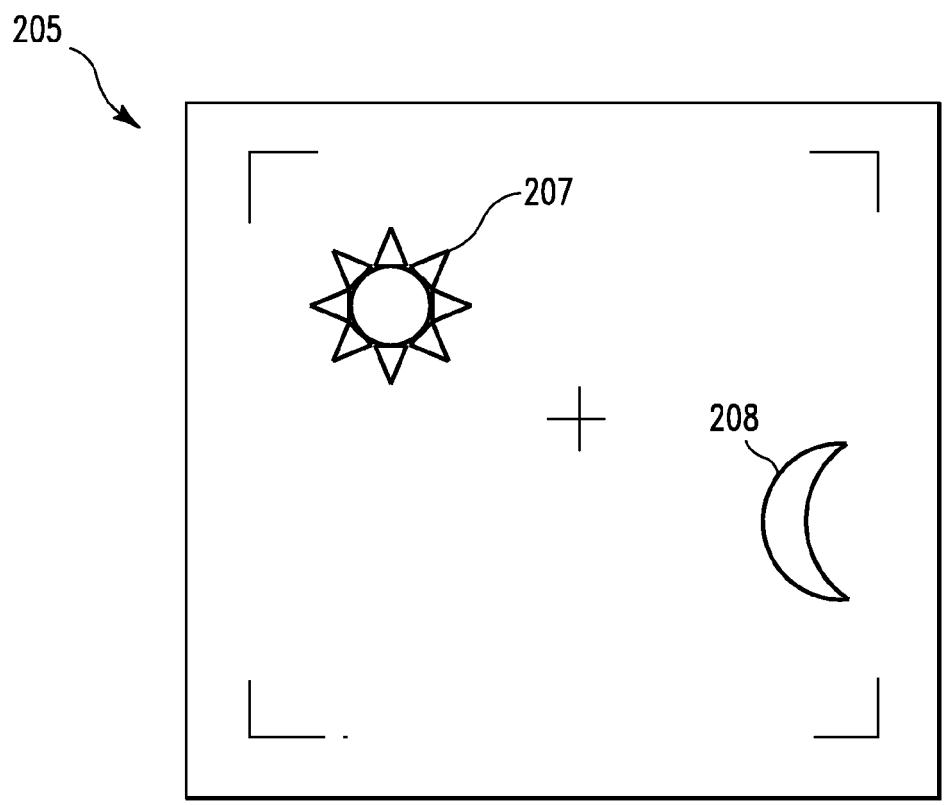
FIG. 2A illustrates a first object facing internal logic view of a computing apparatus for determining a line of sight between a user and an object for image placement on a transparent display apparatus, in accordance with embodiments of the present invention.

FIGS. 1A and 1B illustrate a system 100 for determining a line of sight 127a or 127b between a user 102 and an object 108 relative to a transparent display apparatus 104 including transparent display 104a and 104b, in accordance with embodiments of the present invention. The above and other features of the present invention will become more distinct by a detailed description of embodiments shown in combination with attached drawings. Identical reference numbers represent the same or similar parts in the attached drawings of the invention.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Computer program code for carrying out operations for aspects of the present invention can be written in any combination of one or more programming languages, including an object oriented programming language such as Java, Smalltalk, C++ or the like and conventional procedural programming languages, such as the "C" programming language, an assembly programming language, functional programming languages or similar programming languages. The program code can execute entirely on the user's computer, partly on the user's computer, as a stand-alone software package, partly on the user's computer.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. Additionally, aspects of the functions/acts may be "hard coded" to perform a step with limited external input.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which may include one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

System 100 performs a process for determining an area where images (for objects) should be placed such that they account for a user's (for a user 102) line of sight 127a through a transparent display apparatus 104 (e.g., a window, a heads up display (HUD), etc). Line of sight is defined herein as including all equivalent information to a line of sight and/or information capable of deriving a line of sight. For example, a line of sight may be calculated to determine image placement. Alternatively, a line of sight may include a set of processed measurements for producing a location of image placement.

System 100 includes user facing devices (or cameras) 112a and 112b and object facing devices (or cameras) 110a and 110b attached to display apparatus 104 and connected to a computing system for processing. User facing devices 112a and 112b identify a relative special position of the user's eyes with respect to display apparatus 104. Object facing devices 110a and 110b simultaneously identify an object(s) spacial position on an opposite side (i.e., from user 102) of display apparatus 104.

System 100 enables a generic pattern recognition process with respect to facial features via a user facing devices 112a and 112b (e.g., recognition of relative positions of anatomical features including, inter alia, eyes, ears, nose, etc.) to triangulate a relative eye position in order to infer line of sight information. System 100 may determine the angle and distance of a user's eyes/face from itself using user facing devices 112a and 112b via paths 115a, 116a, 115b, and 116b, respectively. The various spacial positions are used to determine a position of an image presentation on display apparatus 104 relative to viewable objects (e.g., object 108) from a perspective of user 102. Additionally or alternatively, the image presentation may include an illumination of display apparatus 104 (e.g., an image projection, an image reflection, an image hologram, etc).

System 100 includes transparent display apparatus 104 (including transparent displays 104a and 104b) that includes user facing devices 112a and 112b and object facing devices cameral 10a and 110b connected to a computing system for discerning a user's 102 relative eye position and for discerning an object's 108 relative position with respect to display apparatus 104. Display apparatus 104 may include any type of display apparatus including, inter alia, windows, an HUD, etc. System 100 allows image selections to be made by a relative position of a display apparatus, user, and object irrespective of an angle or geometry of the display apparatus.

System 100 includes multiple fixed user facing devices (i.e., user facing cameras 112a and 112b) enabling a triangulation process for determining the user's relative position. Additionally, multiple object facing devices (i.e., object facing devices 110a and 110b) enable a triangulation process with respect to objects such that an accurate line of sight (i.e., line of sight 127a) may be determined. The aforementioned information may be used to determine where to display information (on display apparatus 104) relative to user 102. For example, with respect to transparent glass capable of displaying data, forward and rear facing devices (e.g., user facing devices 112a and 112b and object facing devices 110a and 110b) in combination with a computing system determine where to display data on the transparent glass such that the data appropriately overlays a scene behind the transparent display. As an example, a ship's bridge could use the aforementioned information to overlay information on landmarks, deckhands, or detected objects on its windows such that a user would have an accurate representation of where these objects are, irrespective of the user's position on the bridge. As a second example, with respect to a windshield capable of dimming in select areas, sets of forward and rear facing devices may determine which portions of a windshield should be dimmed such that bright objects may be attenuated from a user's perspective, regardless of where the user is positioned relative to the windshield.

An implementation example enabled by system 100 allows a user 102 to look through a set of windows (i.e., display apparatus 104 shaped as rounded rectangles) from two different angles (i.e., a first position illustrated in FIG. 1A and a second position illustrated in FIG. 1B). Object and user facing devices (i.e., user facing devices 112a and 112b and object facing devices 110a and 110b) interpret the locations of both user 102 and an object 108 relative to the windows (i.e., via line of sight 127a or 127b). Using the interpretation of the locations, an arrow 108a may be displayed on an appropriate area of the window such that user 102 is able to view arrow 108a overlain and accurately pointing to object 108 along line of sight 127a or 127b. Additionally, the forward and user facing devices may account for a vertical offset of both user 102 and object 108. Additional images related to objects may be simultaneously displayed in position relative to user 102 and respective objects.

Additionally, symbols describing relationships between objects may be enabled. Relationships may include, inter alia, a distance between two objects, etc. The following implementation example describes a process associated with symbols describing relationships between objects:

A display system installed on a crane may display information associated with a location of a lifted load relative to the ground. The display system retrieves and combines information associated with the location of the lifted load and a geometry of the ground resulting in a box (being displayed) indicating a location on the ground that the load is positioned above.

FIG. 2A illustrates a first object facing internal logic view/object image 205 of a computing apparatus for determining a line of sight between a user and an object for image placement on a transparent display apparatus, in accordance with embodiments of the present invention. Internal logic view/object image 205 illustrates a retrieved image of objects 207 and 208. An image of an object may be created using information from any type of sensor that may convey information to identify a specific position. For example, in the aforementioned implementation example, an image of an object may include a measurement of a boom angle and a length of a cable supporting a load. Additionally, note that the determination of the load-ground system as a first object, with measurements of boom angle and cable length comprising the object's key features may be "hard coded," (i.e. the display system may be designed/configured to process a set of specific measurements without determination at runtime). Prior to, simultaneously, or subsequent to the process enabled by internal logic view/object image 205, a relative location of a user is determined. The determination of a relative position of a user is described in detail with respect to FIGS. 4A-4C, infra.

Figure 2B:
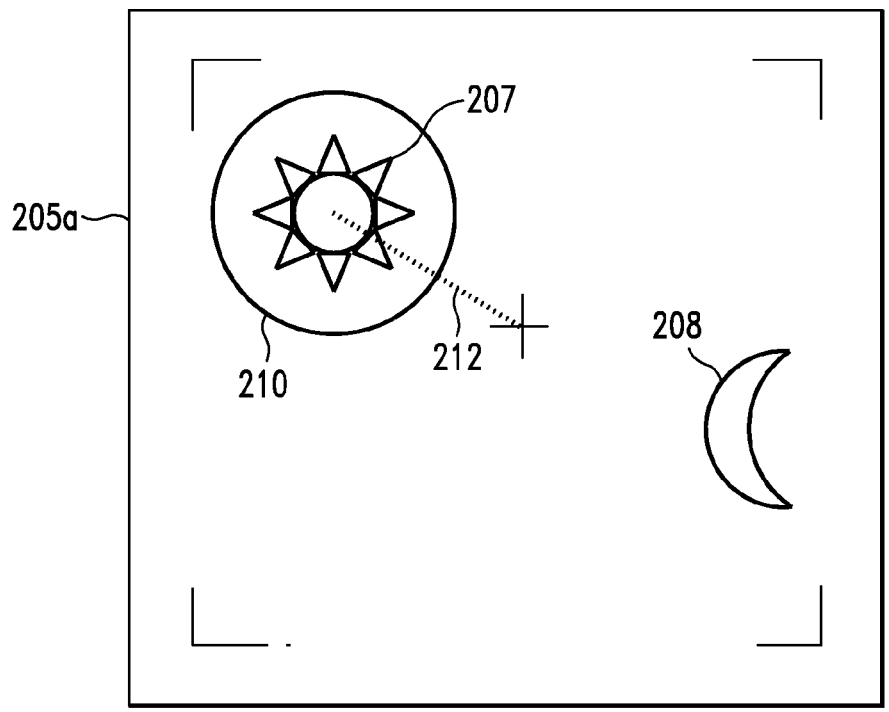
FIG. 2B illustrates a second object facing internal logic view of a computing apparatus for determining a line of sight between a user and an object for image placement on a transparent display apparatus, in accordance with embodiments of the present invention.

FIG. 2B illustrates a second object facing internal logic view 205*a* of the computing apparatus for determining a line of sight between a user and an object for image placement on a transparent display apparatus, in accordance with embodiments of the present invention. Second internal logic view 205*a* enables a process for identifying object 207 for image placement. Enhancement marker 210 includes a marker symbolic of a process for identifying object 207. Additionally, a relative angle (i.e., represented by line 212) and distance to the object facing device is determined. The distance may be determined by additional information passed by the object facing device to a processor of the computing apparatus. For example, a radar that determines a distance as well as an angle, a stereoscopic image that is processed to determine a distance of object 207. Information relating to object 207 is retrieved for image placement on a transparent a display apparatus. Additionally, a symbol or text associated with object 207 may be generated for image placement on the transparent display apparatus.

Figure 3A:
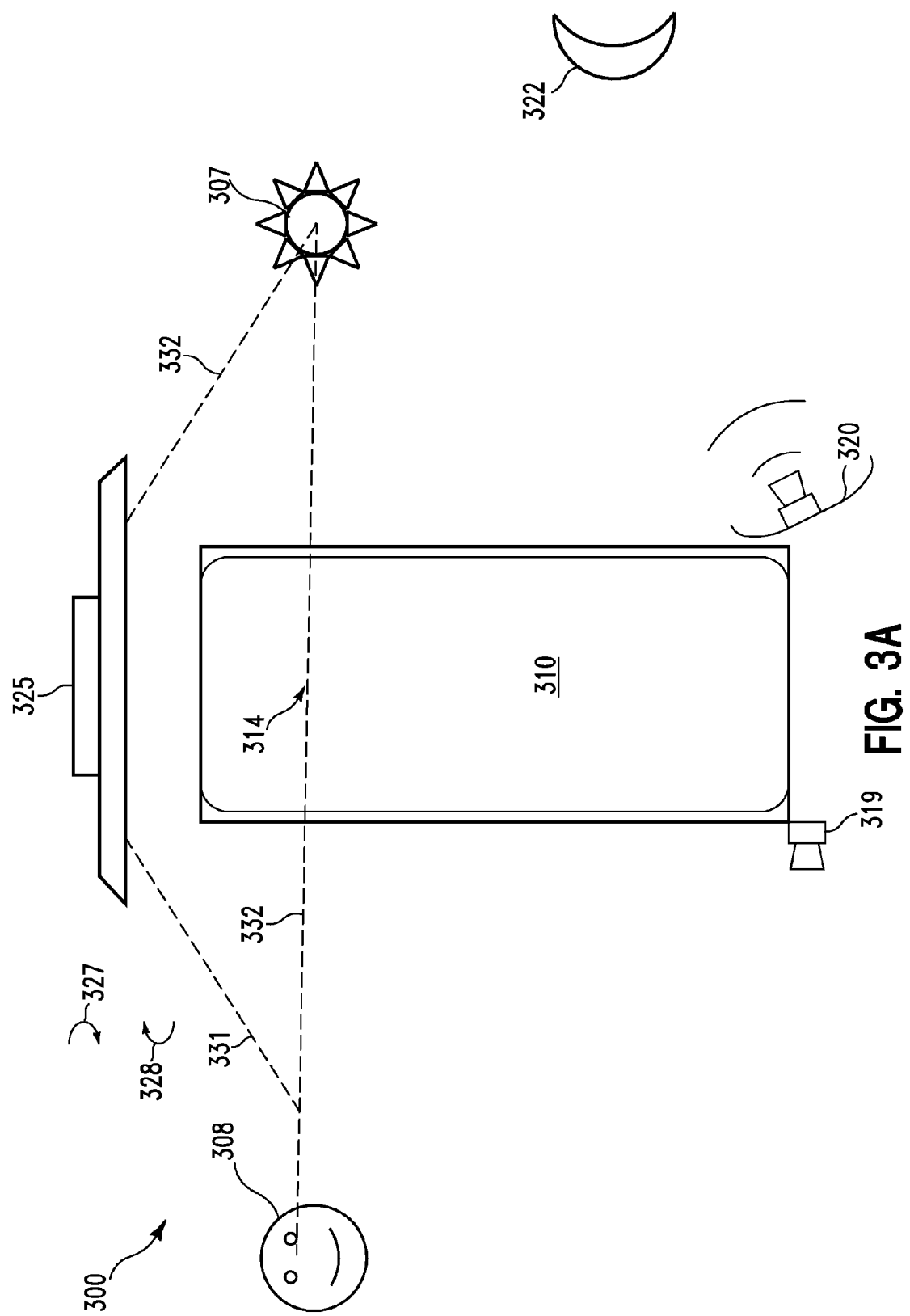
FIG. 3A illustrates a system for displaying information associated with an object on a transparent display apparatus, in accordance with embodiments of the present invention.

FIG. 3A illustrates a system 300 for displaying information 314 associated with an object 307 on a transparent display apparatus 310, in accordance with embodiments of the present invention. Information 314 may include any type of information associated with object 307 including, inter alia, an arrow, text (e.g., sun), an animated image of object 307, etc. Information 314 is displayed such that information 314 is located relative to a line of sight 312 between eyes of a user 308 and object 307. Line of sight 312 may be calculated from data retrieved from a user facing device 319 and an object facing device 320 in combination with a location of transparent display apparatus 310. Alternatively, user facing device 319 and object facing device 320 may be replaced by a wide field of view device 325 configured to be rotated in a direction 327 and a direction 328 such that the wide field of view device 325 is placed in a user facing device mode and an object facing device mode. The user facing device mode and the object facing device mode allow a line of sight 331 and a line of sight 332 to be calculated from data retrieved from wide field of view device 325 in combination with a location of transparent display apparatus 310.

Figure 3B:
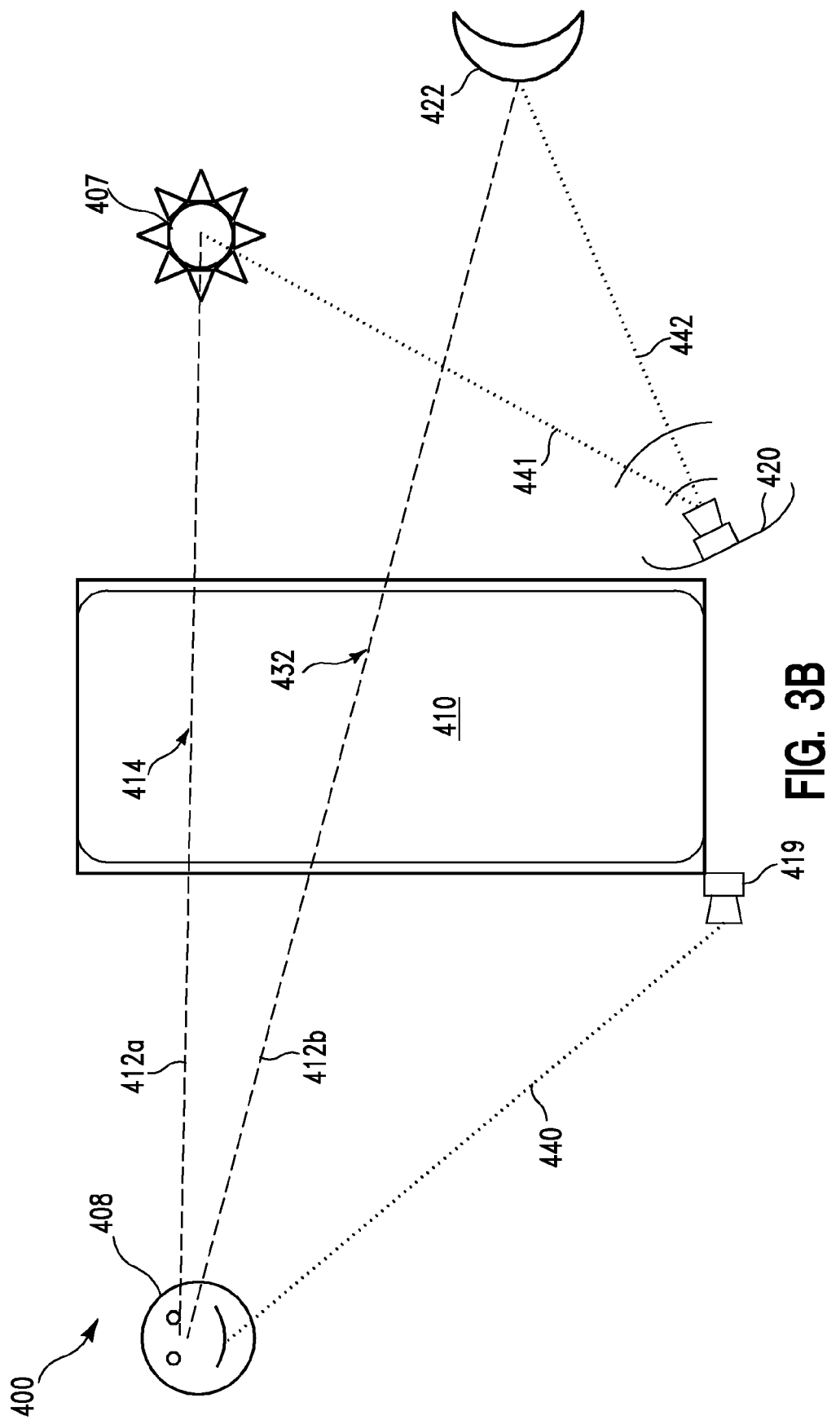
FIG. 3B illustrates a system for displaying multiple information associated with an objects on a transparent display apparatus, in accordance with embodiments of the present invention

FIG. 3B illustrates a system 400 for displaying multiple information 414 and 432 associated with an objects 407 and 422 (respectively) on a transparent display apparatus 410, in accordance with embodiments of the present invention. Information 414 and 432 may include any type of information associated with objects 407 and 422 including, inter alia, an arrow, text (e.g., sun, moon, etc), an animated image of an object, etc. Information 414 is displayed such that information 414 is located relative to a line of sight 412*a* between eyes of a user 408 and object 407. Likewise, information 432 is displayed such that information 432 is located relative to a line of sight 412*b* between eyes of user 408 and object 422. Line 440 between user 408 and user facing device 419, line 441 between object facing device 420 and object 407, and line 442 between object facing device or sensor 420 and object 422 each include an input to the process for displaying information 414 and 432. Line of sight 412*a* and line of sight 412*b* (or equivalent information) are calculated using information from both user facing device 419 and object facing device or sensor 420.

FIG. 3B illustrates transparent display apparatus 410, user facing device or sensor 419, and object facing device 420 mechanically coupled at a known location relative to each other thereby enabling one example method of calculations for placement of information 414 and 432. User facing device 419 may determine a distance by analysis of facial features or other means (e.g., sensors) that pass range information or triangulation with multiple user facing devices or sensors.

Figure 4A:
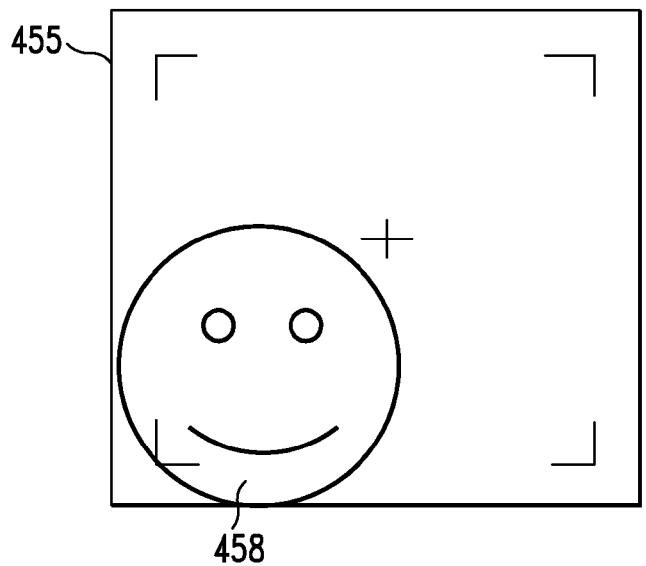
FIGS. 4A-4C illustrate various internal logic views of the computing apparatus of FIGS. 1A and 1B, in accordance with embodiments of the present invention.

FIG. 4A illustrates an internal logic view/user image 455 of the computing system described with respect to FIGS. 1A and 1B, in accordance with embodiments of the present invention. Internal logic view/user image 455 illustrates a retrieved image of a user 458. Image 455 may be retrieved using a user facing device.

Figure 4B:
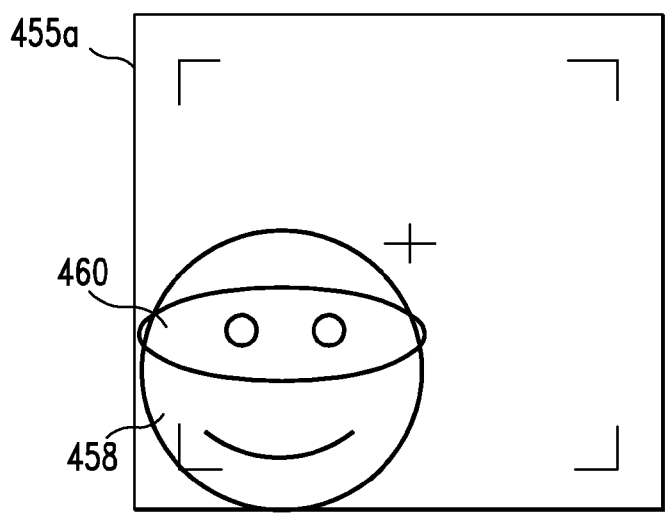

FIG. 4B illustrates an internal logic view 455*a* of the computing system described with respect to FIGS. 1A and 1B, in accordance with embodiments of the present invention. Internal logic view 455*a* illustrates a method for identifying key features 460 of a user's face or head. The key features are used to determine a position of the user's eyes relative to a user facing device.

Figure 4C:
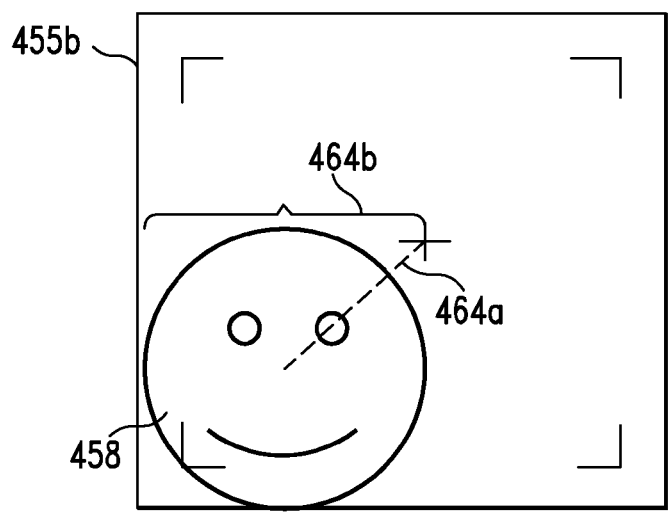

FIG. 4C illustrates an internal logic view 455*b* of the computing system described with respect to FIGS. 1A and 1B, in accordance with embodiments of the present invention.

Internal logic view 455*b* illustrates a process for identifying a user face, relative angle, and distance relative to a user facing device. Internal logic view 455*b* illustrates logic for determining an origin of the user's line of sight (i.e., in 3D coordinates or a distance measured and location of the origin of the user's line of sight relative to a field of view), face angle, relative angle, and/or distance. A face angle is defined herein as an angle of the user's head relative to the user facing device (e.g., is the user's head turned). A relative angle is defined herein as a determination of a location of the user's eyes relative to the user facing device. A distance is defined herein as an approximate distance of the user derived from: a measurement of facial features that may factor in a face angle; a triangulation process using a plurality of devices; and/or a range sensor, etc. Data 464*a* includes a symbolic representation of user's 408 relative angle with respect to user facing device 419. Data 464*b* may include information used to determine an angle, face angle, and distance of the user with respect to the user facing device.

Figure 5:
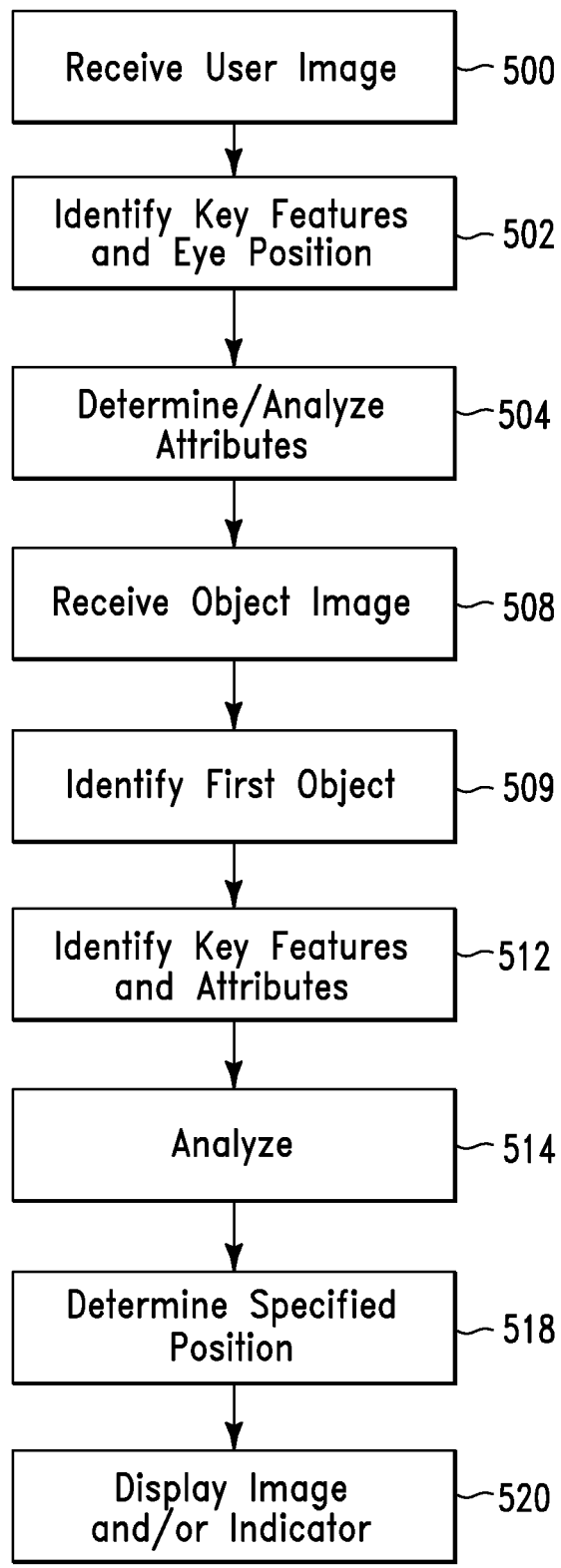
FIG. 5 illustrates an algorithm detailing a process flow enabled by the system of FIGS. 1A and 1B, in accordance with embodiments of the present invention.

FIG. 5 illustrates an algorithm detailing a process flow enabled by system 100 of FIGS. 1A and 1B, in accordance with embodiments of the present invention. Each of the steps in the algorithm of FIG. 5 may be enabled and executed by a computer processor executing computer code. In step 500, a computing system receives an image of a user from a user facing device (or sensor). In step 502, program instructions identify key features of the image. Additionally, program instructions may determine a position of the user's eyes with respect to the user facing device on based on the key features. The key features may include facial features of the user. The facial features may include eyes of the user. In step 504, program instructions determine and analyze attributes of the key features. Determining the attributes may include, inter alia: determining an angle of the user's head with respect to the user facing device, determining a distance of the user with respect to the user facing device, etc. In step 508, program instructions receive an object image of objects. In step 509, program instructions identify a first object of the objects. In step 512, program instructions identify object key features and associated attributes of the first object. In step 514, program instructions analyze the object attributes. In step 518, program instructions determine a specified position on a transparent display for displaying a first image associated with the first object based on the analysis of steps 504 and 514. The first image may include, inter alia, an actual image of the first object, a graphical representation of the first object, a magnified image of a distant object of the objects, text associated with the first object, etc. In step 520, program instructions display the first image at the specified position on the transparent display. Additionally, program instructions may display an indicator referring to the first image. The first image may include an attenuation of transparency of the transparent display or an enhancement of transparency of the transparent display.

Figure 6:
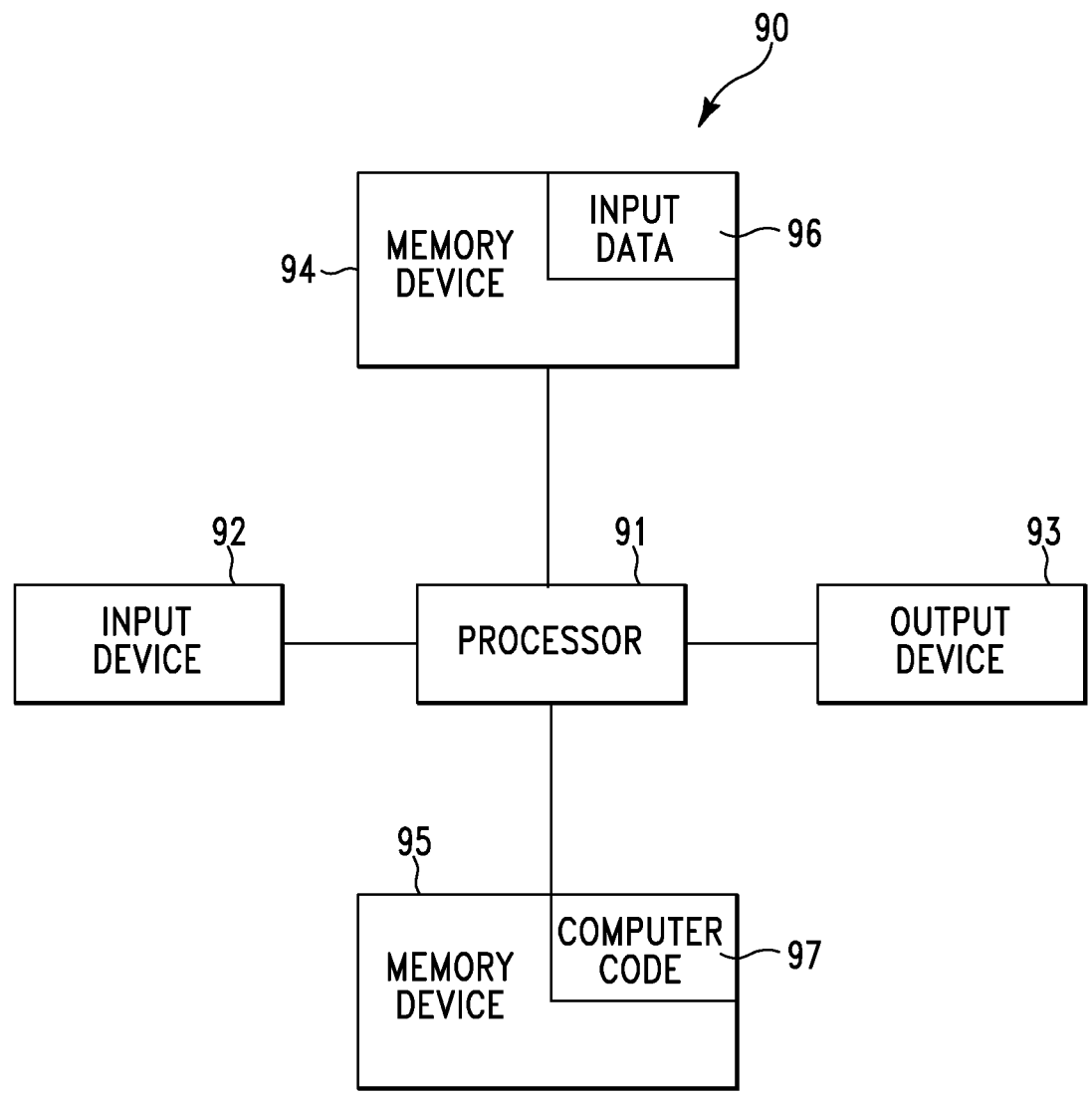
FIG. 6 illustrates a computer apparatus used by the system of FIG. 1 for determining a line of sight between a user and an object relative to a transparent display apparatus, in accordance with embodiments of the present invention.

FIG. 6 illustrates a computer apparatus 90 (e.g., the computing system described with respect to FIGS. 1A and 1B FIG. 1A) used by system 100 of FIGS. 1A and 1B for determining a line of sight between a user and an object for image placement on a transparent display apparatus, in accordance with embodiments of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a sensor, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 5) for determining a line of sight between a user and an object for image placement on a transparent display apparatus. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may include the algorithm of FIG. 5 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to determine a line of sight between a user and an object relative to a transparent display apparatus. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for determining a line of sight between a user and an object for image placement on a transparent display apparatus. In another embodiment, the invention provides a business method that performs the process steps of the invention on a subscription, advertising, and/or fee basis. That is, a service supplier, such as a Solution Integrator, could offer to for determine a line of sight between a user and an object for image placement on transparent display apparatus. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
   identifying, by a computer processor of a computing apparatus, user image key features of a user image received from a user facing device;
   determining, by said computer processor based on said user image key features, user image attributes of said user image key features;
   first analyzing, by said computer processor, said user image attributes;
   receiving, by said computer processor from an object facing device, an object image of objects;
   identifying, by said computer processor, object key features of a first object of said objects;
   determining, by said computer processor based on said object key features, object attributes of said object key features;
   second analyzing, by said computer processor, said object attributes;
   determining, by said computer processor based on said key features, a first angular position of eyes of said user with respect to said user facing device;
   determining, by said computer processor based on said key features, a second angular position of a head of said user with respect to said user facing device;
   determining, by said computer processor based on results of said first analyzing, said second analyzing, said first angular position, and said second angular position, a specified position on a transparent display for displaying a first image associated with said first object;
   displaying, by said computer processor at said specified position on said transparent display, said first image;
   displaying, by said computer processor on said transparent display, a second image of a second object of said objects;
   determining, by said computer processor, an actual distance between said first object and said second object; and
   displaying, by said computer processor on said transparent display, a symbol indicating said actual distance.

2. The method of claim 1, wherein said first image comprises an actual image of said first object.

3. The method of claim 1, wherein said first image comprises a graphical representation related to said first object.

4. The method of claim 1, wherein said objects comprise a composition of multiple subsets of said objects.

5. The method of claim 1, wherein said first image comprises text associated with said first object.

6. The method of claim 1, wherein said key features comprise facial features of said user.

7. The method of claim 1, wherein said determining said user image attributes comprises:
   determining a distance of said user with respect to said user facing device.

8. The method of claim 1, wherein specified position comprises a point within a field of view of said user, and wherein said point is located relative to a line formed between an origin of a line of sight of said user and an actual location of said first object.

9. The method of claim 8, further comprising:
   displaying, by said computer processor on said transparent display at a position with respect to said point, said first image.

10. The method of claim 9, further comprising:
    displaying, by said computer processor on said transparent display at a position with respect to said point, an indicator referring to said first image, wherein said first image is located at a position outside of the display with respect to a field of view of said user.

11. The method of claim 1, wherein said first image comprises an attenuation of transparency of said transparent display.

12. The method of claim 1, wherein said first image comprises an enhancement of transparency of said transparent display.

13. The method of claim 1, wherein said user facing device comprises a plurality of user facing devices, and wherein said object facing device comprises a plurality of object facing devices.

14. The method of claim 1, wherein said user facing device and said object facing device comprise a wide field of view device configured to be rotated such that said wide field of view device is placed in a user facing device mode and an object facing device mode.

15. The method of claim 1, wherein said identifying said object key features of said first object is executed using a set of instructions selected from the group consisting of soft coded instructions and hard coded instructions.

16. The method of claim 1, wherein said first image comprises an illumination of said transparent display.

17. The method of claim 1, further comprising: providing a process for supporting computer infrastructure, said process comprising providing at least one support service for at least one of creating, integrating, hosting, maintaining, and deploying computer-readable code in the computing apparatus, wherein the code in combination with the computing apparatus is configured to perform the method of claim 1.

18. A computer program product for field of view region determination on a transparent display, the computer program product comprising:
   one or more computer-readable, hardware storage devices;
   program instructions, stored on at least one of the one or more storage devices, to identify user image key features of a user image received from a user facing device;
   program instructions, stored on at least one of the one or more storage devices, to determine based on said user image key features, user image attributes of said user image key features;
   program instructions, stored on at least one of the one or more storage devices, to perform a first analyses of said user image attributes;
   program instructions, stored on at least one of the one or more storage devices, to initiate receiving from an object facing device, an object image of objects;
   program instructions, stored on at least one of the one or more storage devices, to identify object key features of a first object of said objects;
   program instructions, stored on at least one of the one or more storage devices, to determine, based on said object key features, object attributes of said object key features;
   program instructions, stored on at least one of the one or more storage devices, to perform a second analyses of said object attributes;
   program instructions, stored on at least one of the one or more storage devices, to determine, based on said key features, a first angular position of eyes of said user with respect to said user facing device;
   program instructions, stored on at least one of the one or more storage devices, to determine, based on said key features, a second angular position of a head of said user with respect to said user facing device;
   program instructions, stored on at least one of the one or more storage devices, to determine, based on results of said first analyses, said second analyses, said first angular position, and said second angular position, a specified position on a transparent display for displaying a first image associated with said first object;
   program instructions, stored on at least one of the one or more storage devices, to initiate displaying, at said specified position on said transparent display, said first image;
   program instructions, stored on at least one of the one or more storage devices, to display on said transparent display, a second image of a second object of said objects;
   program instructions, stored on at least one of the one or more storage devices, to determine an actual distance between said first object and said second object; and
   program instructions, stored on at least one of the one or more storage devices, to display on said transparent display, a symbol indicating said actual distance.

19. A computing apparatus comprising a computer processor coupled to a computer-readable memory unit, said memory unit comprising instructions that when executed by the computer processor implements a method comprising:
   identifying, by said computer processor, user image key features of a user image received from a user facing device;
   determining, by said computer processor based on said user image key features, user image attributes of said user image key features;
   first analyzing, by said computer processor, said user image attributes;
   receiving, by said computer processor from an object facing device, an object image of objects;
   identifying, by said computer processor, object key features of a first object of said objects;
   determining, by said computer processor based on said object key features, object attributes of said object key features;
   second analyzing, by said computer processor, said object attributes;
   determining, by said computer processor based on said key features, a first angular position of eyes of said user with respect to said user facing device;
   determining, by said computer processor based on said key features, a second angular position of a head of said user with respect to said user facing device;
   determining, by said computer processor based on results of said first analyzing, said second analyzing, said first angular position, and said second angular position, a specified position on a transparent display for displaying a first image associated with said first object;

displaying, by said computer processor at said specified position on said transparent display, said first image;

displaying, by said computer processor on said transparent display, a second image of a second object of said objects;

determining, by said computer processor, an actual distance between said first object and said second object; and displaying, by said computer processor on said transparent display, a symbol indicating said actual distance.

20. The computing apparatus of claim 19, wherein said transparent display is comprised by a window of a vehicle.

* * * * *